United States Patent
Portman

(10) Patent No.: US 6,989,171 B2
(45) Date of Patent: *Jan. 24, 2006

(54) SPORTS DRINK COMPOSITION FOR ENHANCING GLUCOSE UPTAKE INTO THE MUSCLE AND EXTENDING ENDURANCE DURING PHYSICAL EXERCISE

(75) Inventor: Robert Portman, Matawan, NJ (US)

(73) Assignee: PacificHealth Laboratories, Inc., Matawan, NJ (US)

( * ) Notice: Subject to any disclaimer, the term of this patent is extended or adjusted under 35 U.S.C. 154(b) by 263 days.

This patent is subject to a terminal disclaimer.

(21) Appl. No.: 10/638,908

(22) Filed: Aug. 11, 2003

(65) Prior Publication Data

US 2004/0033292 A1    Feb. 19, 2004

Related U.S. Application Data

(63) Continuation-in-part of application No. 09/824,357, filed on Apr. 2, 2001, now abandoned.

(51) Int. Cl.
A23L 2/66    (2006.01)

(52) U.S. Cl. .......................... 426/590; 426/72; 426/73; 426/74; 426/443; 426/656; 426/658; 426/810

(58) Field of Classification Search ............... 426/590, 426/656, 658, 443, 72, 73, 74, 810
See application file for complete search history.

(56) References Cited

OTHER PUBLICATIONS

Michael J. Saunders, et al; Effects of a Carboyhydrate-Protein Beverage on Cycling Endurance and Muscle Damage; Published in Medicine & Science in Sports & Exercise by the American College of Sports Medicine; published Mar. 2004; pp. 1233-1238.

John G. Seifer, et al; Fluid Retention Properties of Carbohydrate/Protein and Carbohydrate-Only Sports Drink; to be Published by European College Sports Medicine; Presented Jul. 14, 2005 at Belgrade Conference; one page.

John G. Seifer, et al; Muscle Damage, Fluid Ingestion, and Energy Supplementation Durign Recreational Alpine Skiing; Published International Journal of Sport Nutrition and Exercise Metabolism, Aug. 4, 2005, 15, pp. 528-536.

Travis M. Combest, et al; Attenuated CPK Following Carbohydrate/Protein Intervention Imporves Subsequent Performance; Published in Medicine & Science and Sports & Exercise by the American College of Sports Medicine; Published vol. 37, No. 5 (Supplement), Abstract; May 2005.

Primary Examiner—Helen Pratt
(74) Attorney, Agent, or Firm—Ezra Sutton, Esq.

(57) ABSTRACT

The present invention provides for a nutritional composition in a dry powder form or a liquid drink form for optimizing muscle performance during exercise. The dry nutritional composition includes carbohydrate and protein in a ratio, in the range of 2.8 to 4.2 parts of the carbohydrate to 1.0 part of the protein. One or more carbohydrates are sugars in the range of 50.51% to 84.81% by weight of the dry composition wherein the carbohydrates are a mixture of high and low glycemic sugars. One or more proteins are in the range of 10.29% to 32.25% by weight of the dry composition. The dry nutritional composition further includes a first vitamin being Vitamin C in the range of 0.06% to 1.78% of the dry composition for use as an antioxidant for preventing free radical formation during exercise and includes a second vitamin being Vitamin E in the range of 0.07% to 1.78% of the dry composition for use as an antioxidant for preventing free radical formation during exercise. The dry nutritional composition also includes electrolytes for replenishing electrolytes lost during exercise and for facilitating intestinal reabsorption of fluid.

20 Claims, 1 Drawing Sheet

SPORTS DRINK COMPOSITION FOR ENHANCING GLUCOSE UPTAKE INTO THE MUSCLE AND EXTENDING ENDURANCE DURING PHYSICAL EXERCISE

RELATED APPLICATIONS

This is a continuation-in-part of application Ser. No. 09/824,357, filed on Apr. 2, 2001 now abandoned.

FIELD OF THE INVENTION

The present invention relates to a nutritional composition for optimizing muscle performance and extending endurance during exercise and preventing free radical buildup and muscle damage after exercise. More particularly, the nutritional composition includes carbohydrates and protein in a 4 to 1 ratio to stimulate insulin and glucose uptake during exercise, arginine for stimulating the release of insulin, Vitamins C and E for reducing free radical buildup and electrolytes for replenishing electrolytes and water lost during exercise.

BACKGROUND OF THE INVENTION

Over the past thirty years, there has been extensive research conducted on the role hydration and carbohydrate supplementation play in improving exercise performance. This research led to the development of sports drinks that contain carbohydrate in the range of 6–8%, as well as essential electrolytes such as sodium, potassium, magnesium and chloride. Numerous studies have shown that consumption of a sports drink during exercise containing carbohydrate and electrolytes enables athletes to extend their endurance capacity to a greater extent than by the consumption of water alone.

When a sports drink is consumed during exercise, the carbohydrate is transported from the blood into the muscle where it then can be converted into energy. Normally, glucose uptake is controlled by insulin. However, during periods of intense activity there is a decrease in the production of insulin and glucose is transported into the muscle primarily by the contraction of the muscle cell. The uptake of glucose into the muscle is critical to preserve muscle glycogen. To the degree that muscle glycogen is preserved, there is an enhancement in endurance capacity since more muscle glycogen is then available in the later stages of exercise.

It has been shown that when insulin is stimulated during intense exercise there is greater uptake of glucose. Increasing carbohydrate consumption during exercise can stimulate insulin up to a point. When high levels of carbohydrate are consumed during exercise, however, they do not empty the stomach rapidly, so carbohydrate intake becomes rate limiting in its ability to stimulate insulin.

Previously, it has been shown that when protein is added to a source of carbohydrate, it can provide enhanced stimulation of insulin. The level of protein is critical since protein has been shown to slow gastric emptying. U.S. Pat. No. 6,207,638 showed that when protein is added to carbohydrate in a 4 to 1 ratio, it provides increased insulin stimulation and enhances the synthesis of muscle glycogen with no negative impact on rehydration following exercise.

There is a definite need in the art for sports drinks that will increase the uptake of glucose during exercise, thereby providing an immediate source of energy and improve endurance by the sparing of muscle glocogen stores. It is the object of this invention to provide a sports drink that will improve athletic performance during exercise.

DESCRIPTION OF THE PRIOR ART

Sports drinks to enhance stamina have been disclosed in the prior art.

Prinkkila in U.S. Pat. No. 4,853,237 discloses a fitness drink powder containing glucose polymer, various salts and fruit acid. The drink composition of Prinkkila is designed to be available to the body in an optimum manner. In addition, the drink product is designed to maintain a high sugar concentration in the blood during physical exertion.

In U.S. Pat. No. 5,032,411 Stray-Gunderson discloses a hypotonic beverage with essential electrolytes, minerals and carbohydrates. Because the beverage composition is hypotonic, the stomach empties very rapidly and the composition can produce a beneficial physiologic response.

Kahm in U.S. Pat. No. 4,042,684 discloses a dietetic beverage containing sugar and essential salts. The composition is said to enhance energy stores. In addition, the composition does not require preservatives. The mixture of glucose and fructose used in the composition produces rapid transport of glucose out of the digestive system while fructose is more slowly transported out of the system.

Strahl in U.S. Pat. No. 6,039,987 discloses a composition to prevent dehydration and prevent cramps which contains electrolytes, carbohydrates and quinine.

King in U.S. Pat. No. 5,780,094 discloses a sports beverage containing a saccharide in the amount of 1.25% weight to volume of glucose.

Simone in U.S. Pat. No. 5,397,786 discloses a rehydration drink that contains carbohydrate, various electrolytes and one ammonia neutralizer such as aspartate, arginine and glutamate.

A flavored and sweetened aqueous dietetic beverage used to rehydrate the body is disclosed by Boyle in U.S. Pat. No. 4,874,606. L-aspartyl-L-phenyl-alanine methyl ester is included in the beverage to increase the degree of gastric emptying.

None of the prior art patents disclose the nutritional composition of the present invention for enhancing endurance and performance during exercise.

Accordingly, it is an object of the present invention is to provide a nutritional composition for optimizing muscle performance during exercise.

Another object of the present invention is to provide a nutritional composition that will speed the uptake of glucose into the muscle cell during exercise.

Another object of the present invention is to provide a nutritional composition that will increase the efficiency of every gram of every carbohydrate consumed during exercise.

Another object of the present invention is to provide a nutritional composition for restoring fluid and electrolytes and for replenishing glycogen stores in the muscle and for reducing oxidative and muscle stress.

Another object of the present invention is to provide a nutritional composition to speed the uptake of glucose into the muscle, thereby sparing muscle glycogen stores and extending endurance.

Another object of the present invention is to provide a nutritional composition that restores fluid and electrolyte levels that are depleted during exercise.

Another object of the present invention is to provide a nutritional composition that reduces oxidative stress by preventing the buildup of free radicals that form as a consequence of exercise.

SUMMARY OF THE INVENTION

The present invention provides for a nutritional composition in a dry powder form for optimizing muscle performance during exercise. The dry nutritional composition includes carbohydrate and protein in a ratio, in the range of 2.8 to 4.2 parts of the carbohydrate to 1.0 part of the protein. One or more carbohydrates are sugars in the range of 50.51% to 84.81% by weight of the dry composition wherein the carbohydrates are a mixture of high and low glycemic sugars. One or more proteins are in the range of 10.29% to 32.25% by weight of the dry composition. The dry nutritional composition further includes a first vitamin being Vitamin C in the range of 0.06% to 1.78% of the dry composition for use as an antioxidant for preventing free radical formation during exercise; includes a second vitamin being Vitamin E in the range of 0.07% to 1.78% of the dry composition for use as an antioxidant for preventing free radical formation during exercise. The dry nutritional composition also includes a first electrolyte ion being sodium ($Na^+$) compounds in the range of 0.18% to 1.34% by weight of the dry composition for replenishing electrolytes lost during exercise and for facilitating intestinal reabsorption of fluids; a second electrolyte ion being potassium ($K^+$) compounds in the range of 0.02% to 0.89% by weight of the dry composition for replenishing electrolytes lost during exercise and for facilitating intestinal reabsorption of fluids; and a third electrolyte ion being magnesium ($Mg^{+2}$) compounds in the range of 0.06% to 1.77% by weight of the dry composition for replenishing electrolytes lost during exercise and for facilitating energy dependent processes.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED AND ALTERNATE EMBODIMENTS

Figure 1:
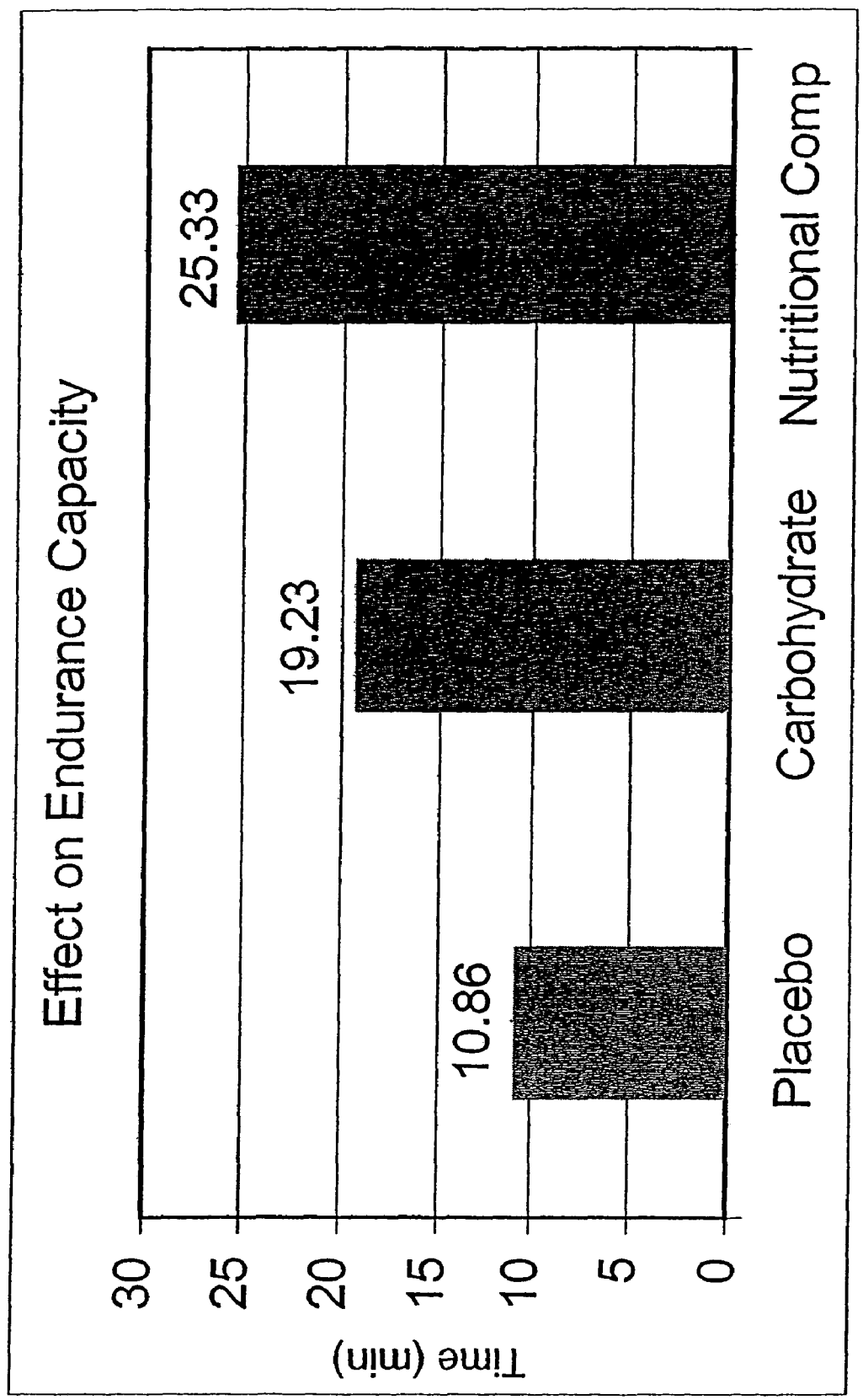
FIG. 1 is a graph showing a comparison of the nutritional composition, a drink containing the same quantity of carbohydrate as the nutritional composition and placebo on endurance capacity during exercise.

The invention is based on the unexpected and surprising discovery that by providing a nutritional composition that contains carbohydrate in the form of high and low glycemic sugars and protein in a ratio in the range of 2.8 to 4.2 parts of said carbohydrates to 1.0 part of said protein the energy efficiency of every gram of carbohydrate consumed during exercise is significantly increased.

A second unexpected and surprising discovery is that a carbohydrate protein ratio in the range of 2.8 to 4.2 parts of said carbohydrates to 1.0 part of said protein permits protein to increase glucose uptake during exercise by stimulating insulin while not interfering with gastric emptying which would impact fluid and carbohydrate absorption during exercise.

A third unexpected and surprising discovery is that the nutritional composition of the present invention significantly increases endurance during exercise when compared to a sports drink containing the same amount of carbohydrate.

The nutritional composition of the preferred and alternate embodiments of the present invention are in a dry form, a liquid drink, a bar or a gel format. The nutritional composition is used to enhance performance and extend endurance during exercise and prevent the build up of free radicals after exercise.

In the present invention the preferred and alternate embodiments of the nutritional composition are as follows for a dry composition and for a liquid drink composition.

Preferred Embodiment

The nutritional composition for improving muscle performance and extending endurance during exercise includes nutritional agents being carbohydrates, proteins, antioxidant Vitamins E and C, the amino acid arginine, electrolytes, flavoring agents, coloring agents and diluents. Carbohydrates include high and low glycemic sugars selected from the group consisting of aldohexoses, disaccharides and polysaccharides, such sugars being glucose, glucose polymers, dextrose, maltose, maltodextrins, maltotriose, lactose, galactose, sucrose, high fructose corn syrup, beet sugar, cane sugar, and sucanat ketohexoses such sugars being arabinose, ribose, fructose, sorbose, tagatose and sorbitol. Total carbohydrates are in the range of 50.51% to 84.81% (See Table B) (For an alternate range, see Table A.) by weight of the dry nutritional composition, having a preferred percentage of 74.57% (See Table A) by weight of the dry nutritional composition.

One or more protein compounds are used in the forming of the dry nutritional composition. These proteins are used as a source of stimulation of insulin during exercise. Protein sources are selected from the group consisting of calcium caseinate, whey protein concentrate, whey protein isolate, whey protein hydrolyzate, soy protein, casein hydrolyzate, rice protein, wheat protein, corn protein and yeast concentrate. Total proteins are in the overall range of 10.29% to 32.25% (See Table B) (For an alternate range, see Fable A.) by weight of the dry nutritional composition, having a preferred percentage of 18.66% (See Table A) by weight of the dry nutritional composition.

Carbohydrates and proteins are in the ratio in the range of 2.8 to 4.2 parts of the carbohydrates to 1.0 part of the protein such that the carbohydrate is used for providing energy during exercise and the protein is used to accelerate the transport of the carbohydrate into the muscle cell during exercise thereby improving the efficiency of each gram of the carbohydrate. When the carbohydrate to protein ratio is less than 2.8, the protein has an adverse effect on gastric emptying which would slow rehydration and glucose absorption during exercise. Our research has shown that at a ratio of 4 to 1 (carbohydrate to protein) the benefits of protein on speeding glucose uptake during exercise are optimized with no negative impact on gastric emptying and rehydration.

The first vitamin compound used is Vitamin C in the overall range of 0.06% to 1.78% (See Table B) (For an alternate range, see Table A.) by weight of the dry nutritional composition, having a preferred percentage of 0.35% (See Table A) by weight of the dry nutritional composition. A second vitamin compound used is Vitamin E in the overall range of 0.07% to 1.78% (See Table B) (For an alternative range, see Table A.) by weight of the dry nutritional composition, having a preferred percentage of 0.35% (See Table A) by weight of the dry nutritional composition. These vitamins are used as antioxidants for preventing free radical formation during exercise.

Electrolytes being sodium, potassium and magnesium compounds are used within the nutritional composition for replenishing the electrolytes lost during exercise, for facilitating intestinal reabsorption of fluids, and for facilitating energy dependent processes. A first electrolyte being sodium compounds include sodium chloride, sodium acetate, acidic sodium citrate, acidic sodium phosphate, sodium bicarbonate, sodium bromide, sodium citrate, sodium lactate, sodium phosphate, anhydrous sodium sulphate, sodium sulphate, sodium tartrate, sodium benzoate and sodium selenite. A second electrolyte being potassium compounds include potassium chloride, potassium acetate, potassium bicarbonate, potassium bromide, potassium citrate, potassium-D-gluconate, monobasic potassium phosphate, potassium tartrate, potassium sorbate and potassium iodide. A third electrolyte being magnesium compounds include magnesium chloride, magnesium oxide, magnesium sulphate, magnesium carbonate, magnesium aspartate and magnesium silicate. A first electrolyte ion being sodium ($Na^+$) compounds are in the overall range of 0.18% to 1.34% (See Table B) by weight of the dry nutritional composition, and have a preferred amount of 0.52% (See Table A) by weight of the dry nutritional composition. A second electrolyte ion being potassium ($K^+$) compounds are in the overall range of 0.02% to 0.89% (See Table B) by weight of the dry nutritional composition, and have a preferred percentage of 0.09% (See Table A) by weight of the dry nutritional composition. A third electrolyte ion being magnesium ($Mg^{+2}$) compounds are in the overall range of 0.28% to 0.42% by weight of the dry nutritional composition and have a preferred percentage of 0.35% by weight of the dry nutritional composition. For alternate overall ranges of electrolytes $Na^+$, $K^+$ and $Mg^{+2}$ see Table A.

Other component constituents of the nutritional composition in dry and liquid form include flavor components and/or colorant components. The flavor component for the nutritional composition of the present invention is provided to impart a particular and characteristic taste and sometimes an aroma to the nutritional composition. The use of a flavor component in the nutritional composition also provides an enhanced aesthetic quality to the nutritional composition which will increase the user's appeal in using the product. The flavor component is selected from the group consisting of water soluble natural or artificial extracts that include apple, banana, cherry, cinnamon, cranberry, grape, honeydew, honey, kiwi, lemon, lime, orange, peach, peppermint, pineapple, raspberry, tangerine, watermelon., wild cherry, and equivalents and combinations thereof, being in the overall range of 2.35% to 8.73% (See Table B) (For an alternate range, see Table A.) by weight of the dry nutritional composition and have a preferred percentage of 4.07% (See Table A) by weight of the dry nutritional composition.

The colorant component for the nutritional composition of the present invention is provided to impart a characteristic color in conjunction with a particular flavor to the nutritional composition. For example, a yellow color is used for a banana flavor, or a red color for a cherry flavor. The colorant component is selected from the group consisting of water soluble natural or artificial dyes that include FD&C dyes (food, drug and cosmetic use dyes) of blue, green, orange, red, yellow and violet; iron oxide dyes; ultramarine pigments of blue, pink, red and violet; and equivalents thereof; being in the overall range of 0.09% to 4.33% (See Table B) (For a alternate range, see Table A.) by weight of the dry nutritional composition having a preferred percentage of 0.03% (see Table A) by weight of the dry nutritional composition. The dyes discussed above are well known, and are commercially available materials, with their chemical structure being described, e.g., in 21 C.F.R. Part 74 (as revised Apr. 1, 1988) and the CTFA Cosmetic Ingredient Handbook, (1988), published by the Cosmetics, Toiletry and Fragrance Association, Inc.

First Alternate Embodiment

Typically, the dry nutritional composition, as shown in Tables A and B, is mixed with water, such that approximately 36 grams of the dry nutritional composition is dissolved in twelve (12) ounces of water (340.2 grams) in order to provide the nutritional drink composition. Tables C and D shows the dry weight in grams of the constituent compounds of the nutritional composition prior to the dilution using water.

Total carbohydrates are in the overall range of 4.06% to 10.33% by weight of the nutritional drink composition having a preferred range of 5.76% to 7.59% by weight of the nutritional drink composition. See Tables D and C, respectively.

Total proteins are in the overall range of 1.37% to 2.19% by weight of the nutritional drink composition having a preferred range of 1.42% to 1.92% by weight of the nutritional drink composition. See Tables D and C, respectively.

The first vitamin compound used is Vitamin C in the overall range of 0.01% to 0.11% by weight of the liquid nutritional composition having a preferred range of 0.03% to 0.04% by weight of the liquid nutritional composition. A second vitamin compound used is Vitamin E in the overall range of 0.01% to 0.11% by weight of the liquid nutritional composition having a preferred range of 0.03% to 0.04% by weight of the liquid nutritional composition. See Tables D and C, respectively.

A first electrolyte ion being sodium ($Na^+$) compounds are in the overall range of 0.03% to 0.08% by weight of the liquid nutritional composition having a preferred range of 0.04% to 0.05% by weight of the liquid nutritional composition. A second electrolyte ion being potassium ($K^+$) compounds are in the overall range of 0.00% to 0.06% by weight of the liquid nutritional composition having a preferred range of 0.01% to 0.01% by weight of the liquid nutritional composition. A third electrolyte ion being magnesium ($Mg^{+2}$) compounds are in the overall range of 0.01% to 0.11% by weight of the liquid nutritional composition having a preferred range of 0.03% to 0.04% by weight of the liquid nutritional composition. See Tables D and C, respectively.

The flavor component is in the overall range of 0.32% to 0.55% by weight of the liquid nutritional composition having a preferred range of 0.31% to 0.42% by weight of the liquid nutritional composition. See Tables D and C, respectively.

The colorant component is in the overall range of 0.01% to 0.28% by weight of the liquid nutritional composition having a preferred range of 0.001% to 0.001% by weight of the liquid nutritional composition. See Tables D and C, respectively.

Other embodiments for the nutritional composition include energy bars where the carrier is in the form of chocolate, oats, wheat, peanut butter, semi-dried fruits, grains and combinations thereof; and a gel.

Clinical Study

A study was conducted to measure the nutritional drink composition of the present invention versus a conventional carbohydrate sports drink containing an equal amount of carbohydrate and a placebo drink. The object of this study was to measure the effect of performance parameters particularly endurance capacity during exercise.

The study was conducted with 10 trained male cyclists between 18–28 years of age measuring the effect of the nutritional composition, a beverage containing an equivalent amount of carbohydrate as the nutritional composition and a placebo beverage. The study was a crossover design in which all subjects received three treatments. On three separate occasions the subjects exercised as follows: (a) a 30 minute warm-up at 35% VO2 max followed by cycling 6 times for 8 minutes at 75% VO2 max alternated with cycling 6 times for 8 minutes at 45% VO2 max. (b) the subjects rested for 3 minutes and thereafter the exercise intensity was increased to 75% VO2 max for 3 minutes followed by 3 minutes at 45% VO2 max (c) the sequence was repeated 9 times. (d) after a second 3 minutes rest period cycling was resumed at 45% VO2 max for 5 minutes, continued at 60% VO2 max for 5 minutes and increased to 85% VO2 max until fatigue. Fatigue was defined as the point in time at which the subjects could no longer maintain the required exercise intensity for 15 seconds continuously or until they stopped cycling for the third time.

During each exercise session, the subjects received either a placebo drink, the nutritional drink composition or a drink containing the same amount of carbohydrate as the nutritional drink composition. The trials were randomly assigned and spaced 7 days apart. During the trial, blood was sampled and exercise parameters were measured.

The results showed that subjects receiving the nutritional drink composition significantly improved (p<0.05) endurance capacity by 24% over the drink containing the same amount of carbohydrate and by 60% over the placebo (water). These results showed that the nutritional drink composition, by stimulating insulin, increased the uptake of glucose into the muscle cell. This glucose could then provide an immediate source of energy to the muscle sparing muscle glycogen. By increasing the energy efficiency of every gram of carbohydrate consumed the nutritional drink composition spares muscle glycogen thereby extending endurance during exercise.

Advantages of the Present Invention

Accordingly, an advantage of the present invention is that it provides for a nutritional composition for optimizing muscle performance during exercise.

Another advantage of the present invention is that it provides a nutritional composition that will speed the uptake of glucose into the muscle cells during exercise.

Another advantage of the present invention is that it provides a nutritional composition that will increase the efficiency of every gram of every carbohydrate consumed during exercise.

Another advantage of the present invention is that it provides for a nutritional composition for restoring fluid and electrolytes, and for replenishing glycogen stores in the muscle and for reducing oxidative and muscle stress.

Another advantage of the present invention is that it provides for a nutritional composition to speed the uptake of glycogen into the muscle, thereby sparing muscle glycogen stores and extending endurance.

Another advantage of the present invention is that it provides for a nutritional composition that restores fluid and electrolyte levels that are depleted during exercise.

Another advantage of the present invention is that it provides for a nutritional composition that reduces oxidative stress by preventing the buildup of free radicals that form as a consequence of exercise.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

TABLE A

PREFERRED EMBODIMENT OF DRY COMPOSITION

| | INGREDIENT | Preferred | % Preferred | Low | High | Low % | High % |
|---|---|---|---|---|---|---|---|
| 1 | Carbohydrates in the form of high and low glycemic sugars selected from the group consisting of aldohexoses, disaccharides and polysaccharides such sugars being glucose, glucose polymers, dextrose, maltose, maltodextrins, maltotriose, lactose, galactose, | 25.66 | 74.57% | 20.53 | 30.79 | 66.16% | 81.48% |
| 2 | Proteins such as calcium caseinate, whey protein concentrate, whey protein isolate, soy protein, casein hydrolyzate, meat protein concentrate and yeast concentrate | 6.42 | 18.66% | 5.14 | 7.70 | 13.26% | 25.60% |
| 3 | A first electrolyte being sodium compounds such as sodium chloride, sodium acetate, acidic sodium citrate, acidic sodium phosphate, sodium amino salicylate, sodium bicarbonate, sodium bromide, sodium citrate, sodium lactate, sodium phosphate, sodium salic | 0.18 | 0.52% | 0.14 | 0.22 | 0.35% | 0.78% |
| 4 | A second electrolyte being potassium compounds such as potassium chloride, potassium acetate, potassium bicarbonate, potassium bromide, potassium citrate, potassium-D-gluconate, monobasic potassium phosphate, potassium tartrate, potassium sorbate and pota | 0.03 | 0.09% | 0.02 | 0.04 | 0.06% | 0.13% |
| 5 | A third electrolyte being magnesium compounds such as magnesium chloride, magnesium oxide, magnesium sulphate, magnesium carbonate, magnesium aspartate and magnesium silicate | 0.12 | 0.35% | 0.10 | 0.14 | 0.23% | 0.52% |
| 6 | A first vitamin being Vitamin C | 0.12 | 0.35% | 0.10 | 0.14 | 0.23% | 0.52% |
| 7 | A second vitamin being Vitamin E such as vitamin E acetate | 0.12 | 0.35% | 0.10 | 0.14 | 0.23% | 0.52% |
| 8 | An amino acid being Arginine | 0.10 | 0.29% | 0.08 | 0.12 | 0.19% | 0.44% |
| 9 | Emulsifier | 0.25 | 0.73% | 0.20 | 0.30 | 0.49% | 1.09% |

TABLE A-continued

PREFERRED EMBODIMENT OF DRY COMPOSITION

| | INGREDIENT | Preferred | % Preferred | Low | High | Low % | High % |
|---|---|---|---|---|---|---|---|
| 10 | Flavors | 1.40 | 4.07% | 1.12 | 1.68 | 2.75% | 5.98% |
| 11 | Colors | 0.01 | 0.03% | 0.01 | 0.01 | 0.02% | 0.04% |
| | | 34.41 | 100.00% | 27.53 | 41.29 | 83.98% | 117.10% |

TABLE B

ALTERNATE EMBODIMENT OF DRY COMPOSITION

| | INGREDIENT | Range-Low | Range-High | Low | High |
|---|---|---|---|---|---|
| 1 | Carbohydrates in the form of high and low glycemic sugars selected from the group consisting of aldohexoses, disaccharides and polysaccharides such sugars being glucose, glucose polymers, dextrose, maltose, maltodextrins, maltotriose, lactose, galactose, | 15.00 | 40.00 | 50.51% | 84.81% |
| 2 | Proteins such as calcium caseinate, whey protein concentrate, whey protein isolate, soy protein, casein hydrolyzate, meat protein concentrate and yeast concentrate | 5.36 | 8.00 | 10.29% | 32.25% |
| 3 | A first electrolyte being sodium compounds such as sodium chloride, sodium acetate, acidic sodium citrate, acidic sodium phosphate, sodium amino salicylate, sodium bicarbonate, sodium bromide, sodium citrate, sodium lactate, sodium phosphate, sodium salic | 0.10 | 0.30 | 0.18% | 1.34% |
| 4 | A second electrolyte being potassium compounds such as potassium chloride, potassium acetate, potassium bicarbonate, potassium bromide, potassium citrate, potassium-D-gluconate, monobasic potassium phosphate, potassium tartrate, potassium sorbate and pota | 0.01 | 0.20 | 0.02% | 0.89% |
| 5 | A third electrolyte being magnesium compounds such as magnesium chloride, magnesium oxide, magnesium sulphate, magnesium carbonate, magnesium aspartate and magnesium silicate | 0.03 | 0.40 | 0.06% | 1.77% |
| 6 | A first vitamin being Vitamin C | 0.04 | 0.40 | 0.06% | 1.78% |
| 7 | A second vitamin being Vitamin E | 0.04 | 0.40 | 0.07% | 1.78% |
| 8 | An amino acid being Arginine | 0.05 | 1.00 | 0.09% | 4.33% |
| 9 | Emulsifier | 0.23 | 1.00 | 0.42% | 4.36% |
| 10 | Flavors | 1.27 | 2.00 | 2.35% | 8.73% |
| 11 | Colors | 0.05 | 1.00 | 0.09% | 4.33% |
| | | 22.17 | 54.70 | 64.15% | 146.36% |

TABLE C

PREFERRED EMBODIMENT OF LIQUID COMPOSITION

| | INGREDIENT | Low | High | Low % | High % |
|---|---|---|---|---|---|
| 1 | Carbohydrates in the form of high and low glycemic sugars selected from the group consisting of aldohexoses, disaccharides and polysaccharides such sugars being glucose, glucose polymers, dextrose, maltose, maltodextrins, maltotriose, lactose, galactose, | 21.38 | 28.51 | 5.76% | 7.59% |
| 2 | Proteins such as calcium caseinate, whey protein concentrate, whey protein isolate, soy protein, casein hydrolyzate, meat protein concentrate and yeast concentrate | 5.35 | 7.13 | 1.42% | 1.92% |
| 3 | A first electrolyte being sodium compounds such as sodium chloride, sodium acetate, acidic sodium citrate, acidic sodium phosphate, sodium amino salicylate, sodium bicarbonate, sodium bromide, sodium citrate, sodium lactate, sodium phosphate, sodium salic | 0.15 | 0.19 | 0.04% | 0.05% |
| 4 | A second electrolyte being potassium compounds such as potassium chloride, potassium acetate, potassium bicarbonate, potassium bromide, potassium citrate, potassium-D-gluconate, monobasic potassium phosphate, potassium tartrate, potassium sorbate and pota | 0.02 | 0.03 | 0.01% | 0.01% |
| 5 | A third electrolyte being magnesium compounds such as magnesium chloride, magnesium oxide, magnesium sulphate, magnesium carbonate, magnesium aspartate and magnesium silicate | 0.10 | 0.13 | 0.03% | 0.04% |
| 6 | A first vitamin being Vitamin C | 0.10 | 0.13 | 0.03% | 0.04% |
| 7 | A second vitamin being Vitamin E such as vitamin E acetate | 0.10 | 0.13 | 0.03% | 0.04% |
| 8 | An amino acid being Arginine | 0.08 | 0.11 | 0.02% | 0.03% |
| 9 | Emulsifier | 0.21 | 0.28 | 0.05% | 0.07% |
| 10 | Flavors | 1.16 | 1.55 | 0.31% | 0.42% |
| 11 | Colors | 0.00 | 0.006 | 0.001% | 0.001% |
| 12 | Water | 340.00 | 340.00 | 89.90% | 92.23% |
| | | 368.65 | 378.20 | 97.59% | 102.43% |

TABLE D

ALTERNATE EMBODIMENT OF LIQUID COMPOSITION

| | INGREDIENT | Range-Low | Range-High | Low % | High % |
|---|---|---|---|---|---|
| 1 | Carbohydrates in the form of high and low glycemic sugars selected from the group consisting of aldohexoses, disaccharides and polysaccharides such sugars being glucose, glucose polymers, dextrose, maltose, maltodextrins, maltotriose, lactose, galactose, | 15.00 | 40.00 | 4.06% | 10.33% |
| 2 | Proteins such as calcium caseinate, whey protein concentrate, whey protein isolate, soy protein, casein hydrolyzate, meat protein concentrate and yeast concentrate | 5.36 | 8.00 | 1.37% | 2.19% |
| 3 | A first electrolyte being sodium compounds such as sodium chloride, sodium acetate, acidic sodium citrate, acidic sodium phosphate, sodium amino salicylate, sodium bicarbonate, sodium bromide, sodium citrate, sodium lactate, sodium phosphate, sodium salic | 0.10 | 0.30 | 0.03% | 0.08% |
| 4 | A second electrolyte being potassium compounds such as potassium chloride, potassium acetate, potassium bicarbonate, potassium bromide, potassium citrate, potassium-D-gluconate, monobasic potassium phosphate, potassium tartrate, potassium sorbate and pota | 0.01 | 0.20 | 0.00% | 0.06% |
| 5 | A third electrolyte being magnesium compounds such as magnesium chloride, magnesium oxide, magnesium sulphate, magnesium carbonate, magnesium aspartate and magnesium silicate | 0.03 | 0.40 | 0.01% | 0.11% |
| 6 | A first vitamin being Vitamin C | 0.04 | 0.40 | 0.01% | 0.11% |
| 7 | A second vitamin being Vitamin E | 0.04 | 0.40 | 0.01% | 0.11% |
| 8 | An amino acid being Arginine | 0.05 | 1.00 | 0.01% | 0.28% |
| 9 | Emulsifier | 0.23 | 1.00 | 0.06% | 0.28% |
| 10 | Flavors | 1.27 | 2.00 | 0.32% | 0.55% |
| 11 | Colors | 0.05 | 1.00 | 0.01% | 0.28% |
| 12 | Water | 340.00 | 340.00 | 86.14% | 93.88% |
| | | 362.17 | 394.70 | 92.02% | 108.25% |

What is claimed is:

1. A nutritional composition in a dry powder form taken during exercise for improving muscle performance and extending endurance during exercise, comprising:
    a) a carbohydrate in the form of high and low glycemic sugars;
    b) one or more proteins;
    c) said one or more proteins are selected from the group consisting of calcium or sodium caseinate, whey protein, whey protein concentrate, whey protein isolate, whey protein hydrolyzate, demineralized whey protein, milk protein, soy protein, soy protein isolate, soy protein concentrate, pea protein, rice protein, casein hydrolyzate, soy flour, rice protein, wheat protein, corn protein and yeast concentrate; and
    d) said carbohydrate and said one or more proteins being in a ratio in the range of 2.8 to 4.2 parts of said carbohydrate to 1.0 part of said one or more proteins.

2. A nutritional composition in accordance with claim 1, further including a first vitamin compound being Vitamin C.

3. A nutritional composition in accordance with claim 1, further including a second vitamin compound being Vitamin E.

4. A nutritional composition in the accordance with claim 1, further including:
    a) a first electrolyte ion being sodium (Na$^+$) compounds for replenishing electrolytes lost during exercise and for facilitating intestinal reabsorption of fluids;
    b) a second electrolyte ion being potassium (K$^+$) compounds for replenishing electrolytes lost during exercise and for facilitating intestinal absorption of fluids; and
    c) a third electrolyte ion being magnesium (Mg$^+$) compounds for replenishing electrolytes lost during exercise and for facilitating energy dependent processes.

5. A nutritional composition in accordance with claim 1, wherein said mixture of high and low glycemic sugars are selected from the group consisting of aldohexoses, disaccharides and polysaccharides, such sugars being glucose, glucose polymers, dextrose, maltose, maltodextrins, maltotriose, lactose, galactose, sucrose, high fructose corn syrup., beet sugar, cane sugar, and sucanat ketohexoses such sugars being arabinose, ribose, fructose, sorbose, tagatose and sorbitol.

6. A nutritional composition in the accordance with claim 5, wherein said mixture of high and low glycemic sugars are in the range of 50.51% to 84.81%.

7. A nutritional composition in the accordance with claim 1, wherein said proteins are in the range of 10.29% to 32.25%.

8. A nutritional composition in a liquid drink form taken during exercise for improving muscle performance and extending endurance during exercise, comprising:
    a) a carbohydrate in the form of high and low glycemic sugars;
    b) one or more proteins;
    c) said one or more proteins are selected from the group consisting of calcium or sodium caseinate, whey protein, whey protein concentrate, whey protein isolate, whey protein hydrolyzate, demineralized whey protein, milk protein, soy protein, soy protein isolate, soy protein concentrate, pea protein, rice protein, casein hydrolyzate, soy flour, rice protein, wheat protein, corn protein and yeast concentrate; and
    d) said carbohydrate and said one or more proteins being in a ratio in the range of 2.8 to 4.2 parts of said carbohydrate to 1.0 part of said proteins.

9. A nutritional composition in the accordance with claim 8, further including a first vitamin compound being Vitamin C.

10. A nutritional composition in accordance with claim 8, further including a second vitamin compound being Vitamin E.

11. A nutritional composition in accordance with claim 8, further including:
   a) wherein said first electrolyte ion being sodium (Na⁺) compounds for replenishing electrolytes lost during exercise and for facilitating intestinal reabsorption of fluids;
   b) wherein said second electrolyte ion being potassium (K⁺) compounds for replenishing electrolytes lost during exercise and for facilitating intestinal absorption of fluids; and
   c) wherein said third electrolyte ion being magnesium (Mg⁺) compounds for replenishing electrolytes lost during exercise and for facilitating energy dependent processes.

12. A nutritional composition in the accordance with claim 8, wherein said mixture of high and low glycemic sugars are selected from the group consisting of aldohexoses, disaccharides and polysaccharides, such sugars being glucose, glucose polymers, dextrose, maltose, maltodextrins, maltotriose, lactose, galactose, sucrose, high fructose corn syrup, beet sugar, cane sugar, and sucanat ketohexoses such sugars being arabinose, ribose, fructose, sorbose, tagatose and sorbitol.

13. A nutritional composition in the accordance with claim 12, wherein said mixture of high and low glycemic sugars are in the range of 4.06% to 10.33%.

14. A nutritional composition in the accordance with claim 8, wherein said proteins are in the range of 1.37% to 2.19%.

15. A nutritional composition in the accordance with claim 8, wherein said sodium (Na⁺) compounds are selected from the group consisting of sodium chloride, sodium acetate, acidic sodium citrate, acidic sodium phosphate, sodium bicarbonate, sodium bromide, sodium citrate, sodium lactate, sodium phosphate, anhydrous sodium sulphate, sodium sulphate, sodium tartrate, sodium benzoate and sodium selenite.

16. A nutritional composition in the accordance with claim 8, wherein said potassium (K⁺) compounds are selected from the group consisting of potassium chloride, potassium acetate, potassium bicarbonate, potassium bromide, potassium citrate, potassium-D-gluconate, monobasic potassium phosphate, potassium tartrate, potassium sorbate and potassium iodide.

17. A nutritional composition in the accordance with claim 8, wherein said magnesium (Mg⁺²) compounds are selected from the group consisting of magnesium chloride, magnesium oxide, magnesium sulphate, magnesium carbonate, magnesium aspartate and magnesium silicate.

18. A nutritional composition in a dry powder form for enhancing muscle performance and extending endurance during exercise and for enhancing muscle cell repair and recovery following the cessation of exercise, comprising:
   a) carbohydrates and proteins in a ratio in the range of 2.8 to 4.2 parts of said carbohydrates to 1.0 part of said proteins; said carbohydrates for providing energy during exercise and said proteins for stimulating the release of insulin to the muscle cells during exercise and for repairing muscle cells after exercise;
   b) Vitamin C for use as an anti-oxidant for preventing free radical formation during exercise and for protecting muscle cell integrity during exercise;
   c) Vitamin E for use as an anti-oxidant for preventing free radical formation during exercise and for protecting muscle cell integrity during exercise; and
   d) one or more electrolytes for replenishing electrolytes lost during exercise and for facilitating intestinal reabsorption of fluids and for facilitating energy dependent processes.

19. A nutritional composition in a bar form for enhancing muscle performance and extending endurance during exercise and for enhancing muscle cell repair an recovery following the cessation of exercise, comprising:
   a) carbohydrates and proteins in a ratio in the range of 2.8 to 4.2 parts of said carbohydrates to 1.0 part of said proteins; said carbohydrates for providing energy during exercise and said proteins for stimulating the release of insulin to the muscle cells during exercise an for repairing muscle cells after exercise;
   b) Vitamin C for use as an anti-oxidant for preventing free radical formation during exercise and for protecting muscle cell integrity during exercise;
   c) Vitamin E for use as an anti-oxidant for preventing free radical formation during exercise and for protecting muscle cell integrity during exercise; and
   d) one or more electrolytes for replenishing electrolytes lost during exercise and for facilitating intestinal reabsorption of fluids and for facilitating energy dependent processes.

20. A nutritional composition in a gel form for enhancing muscle performance and extending endurance during exercise and for enhancing muscle cell repair and recovery following the cessation of exercise, comprising:
   a) carbohydrates and proteins in a ratio in the range of 2.8 to 4.2 parts of said carbohydrates to 1.0 part of said proteins; said carbohydrates for providing energy during exercise and said proteins for stimulating the release of insulin to the muscle cells during exercise and for repairing muscle cells after exercise;
   b) Vitamin C for use as an anti-oxidant for preventing free radical formation during exercise and for protecting muscle cell integrity during exercise
   c) Vitamin E for use as an anti-oxidant for preventing free radical formation during exercise and for protecting muscle cell integrity during exercise; and
   d) one or more electrolytes for replenishing electrolytes lost during exercise and for facilitating intestinal reabsorption of fluids and for facilitating energy dependent processes.

* * * * *